March 25, 1969     C. R. BRANTINGHAM ETAL     3,434,715
STRESS REDUCING FLOOR SURFACE
Filed Oct. 6, 1966
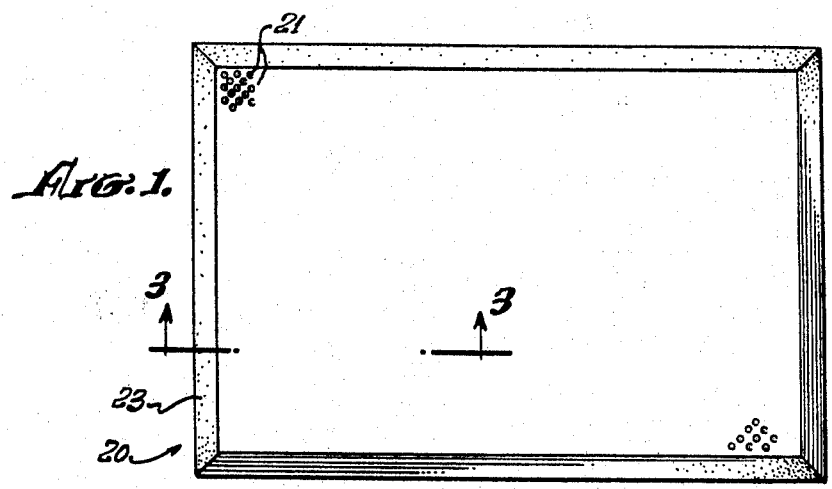
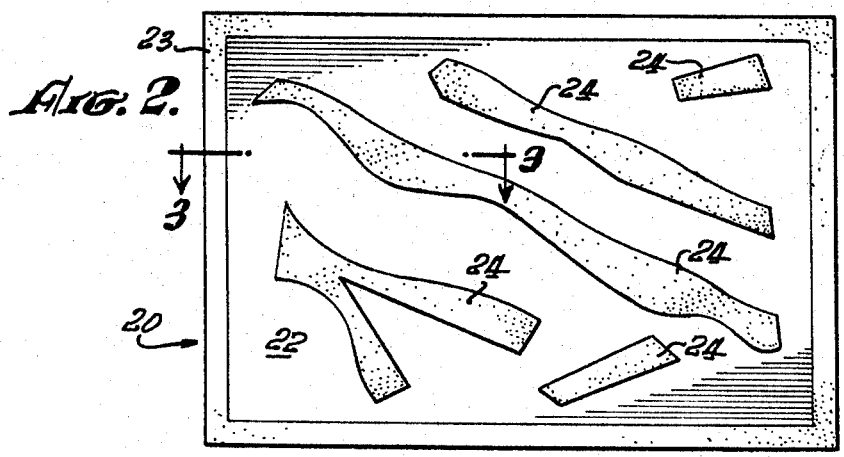
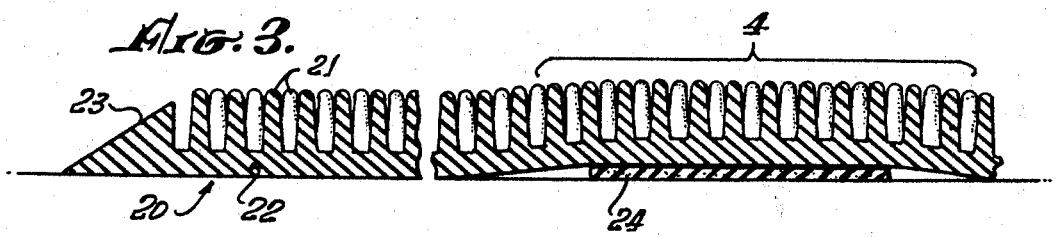
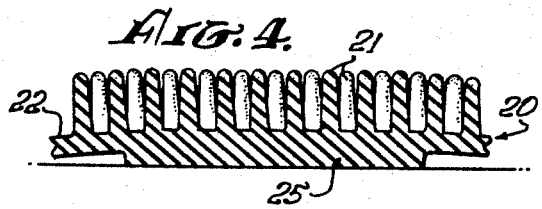
INVENTORS.
CHARLES R. BRANTINGHAM,
BRUCE E. BEEKMAN,
LOREN W. EAMES,
By Harold J. LeConte
ATTORNEY

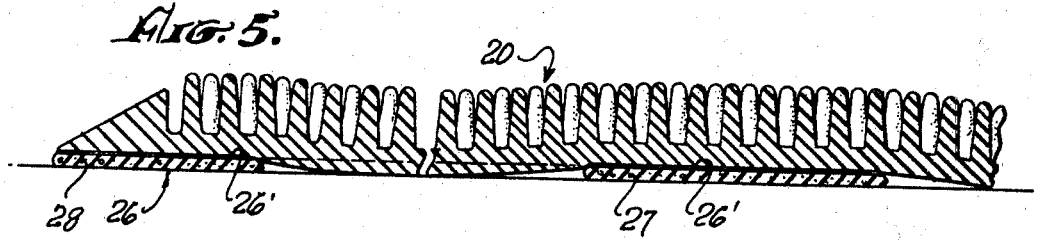
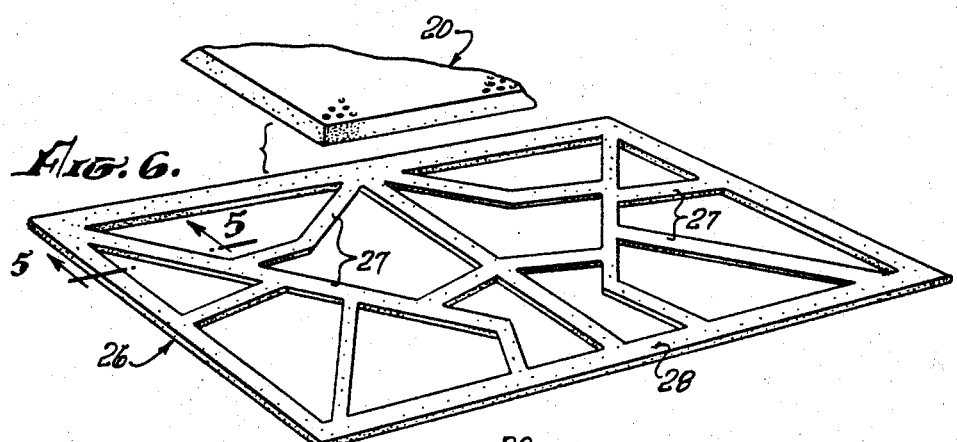
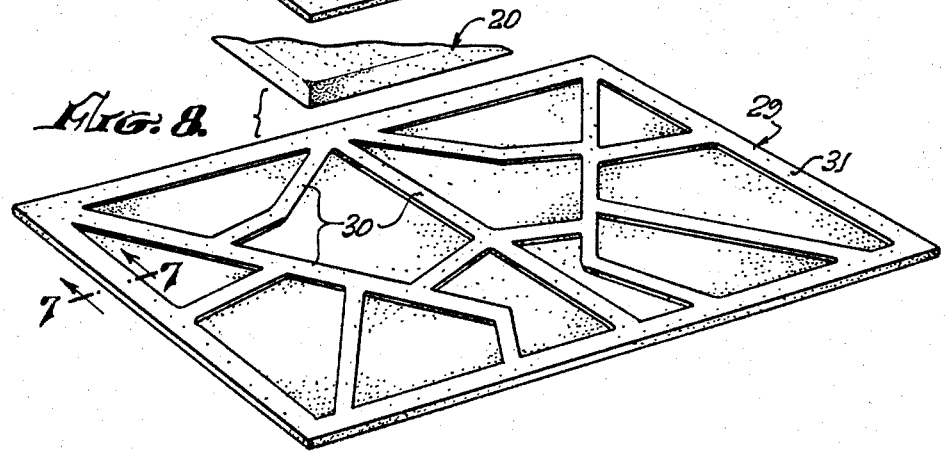
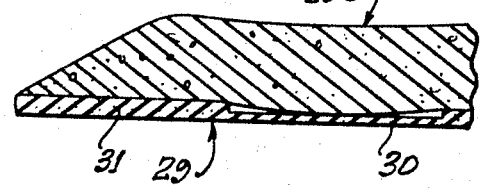

March 25, 1969     C. R. BRANTINGHAM ETAL     3,434,715
STRESS REDUCING FLOOR SURFACE
Filed Oct. 6, 1966                                     Sheet 3 of 5
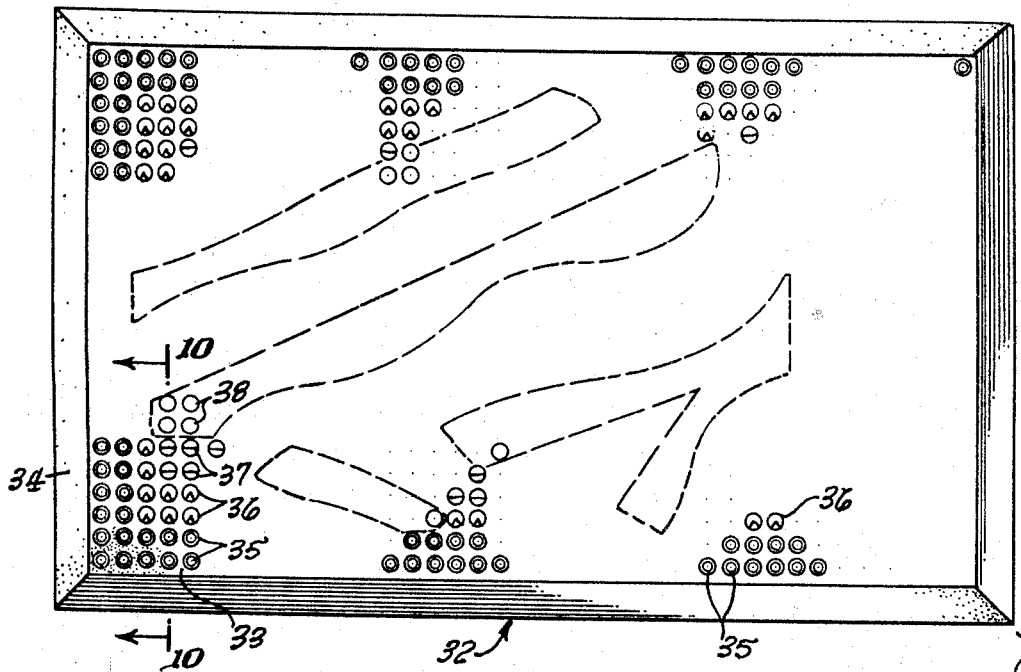
LEGEND
◯ = ¼ Height
⊖ = ½ Height
⊗ = ¾ Height
◎ = Full Height
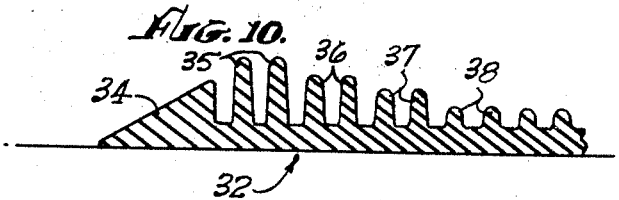
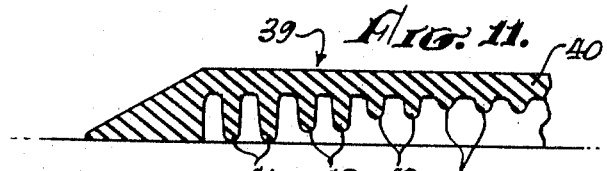
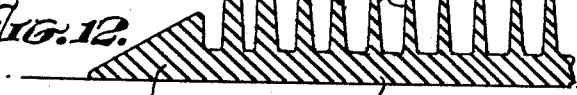
INVENTORS.
CHARLES R. BRANTINGHAM,
BRUCE E. BEEKMAN,
LOREN W. EAMES,
By Harold J. DeLaconte
ATTORNEY.

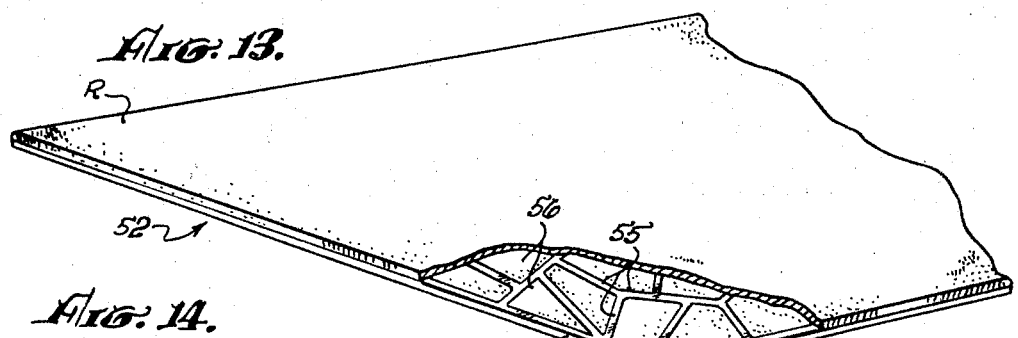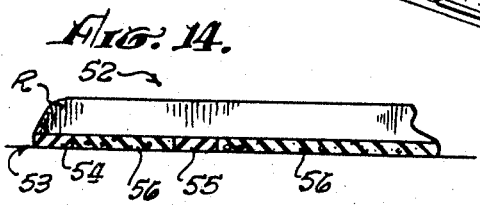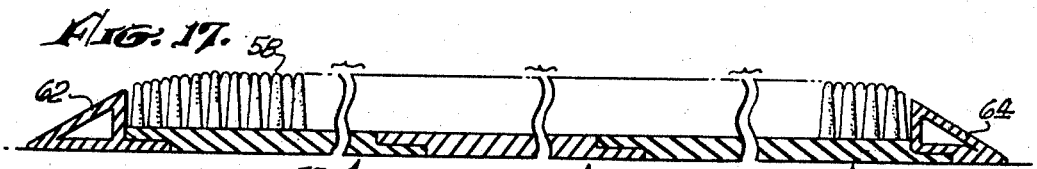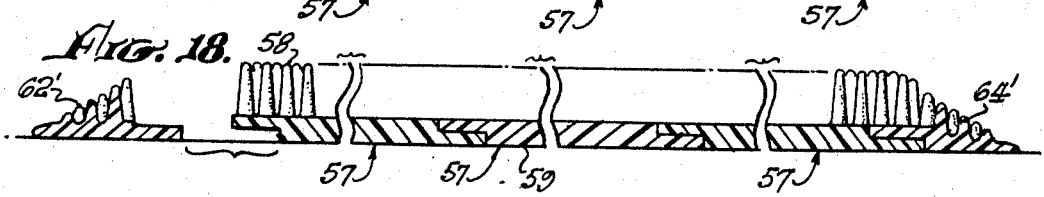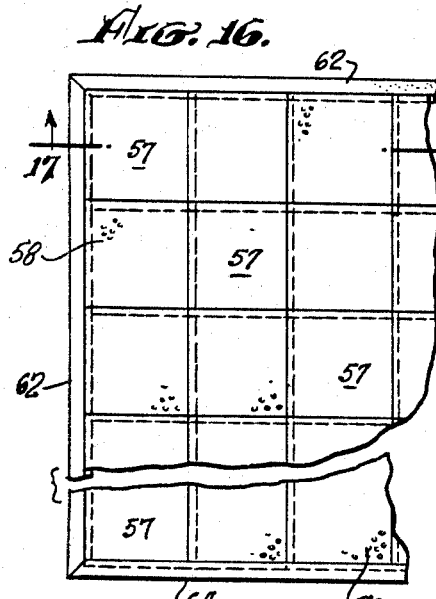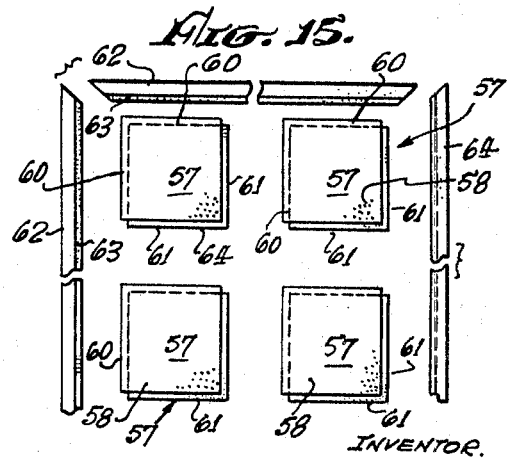
INVENTOR.
CHARLES R. BRANTINGHAM,
BRUCE E. BEEKMAN,
LOREN W. EAMES,

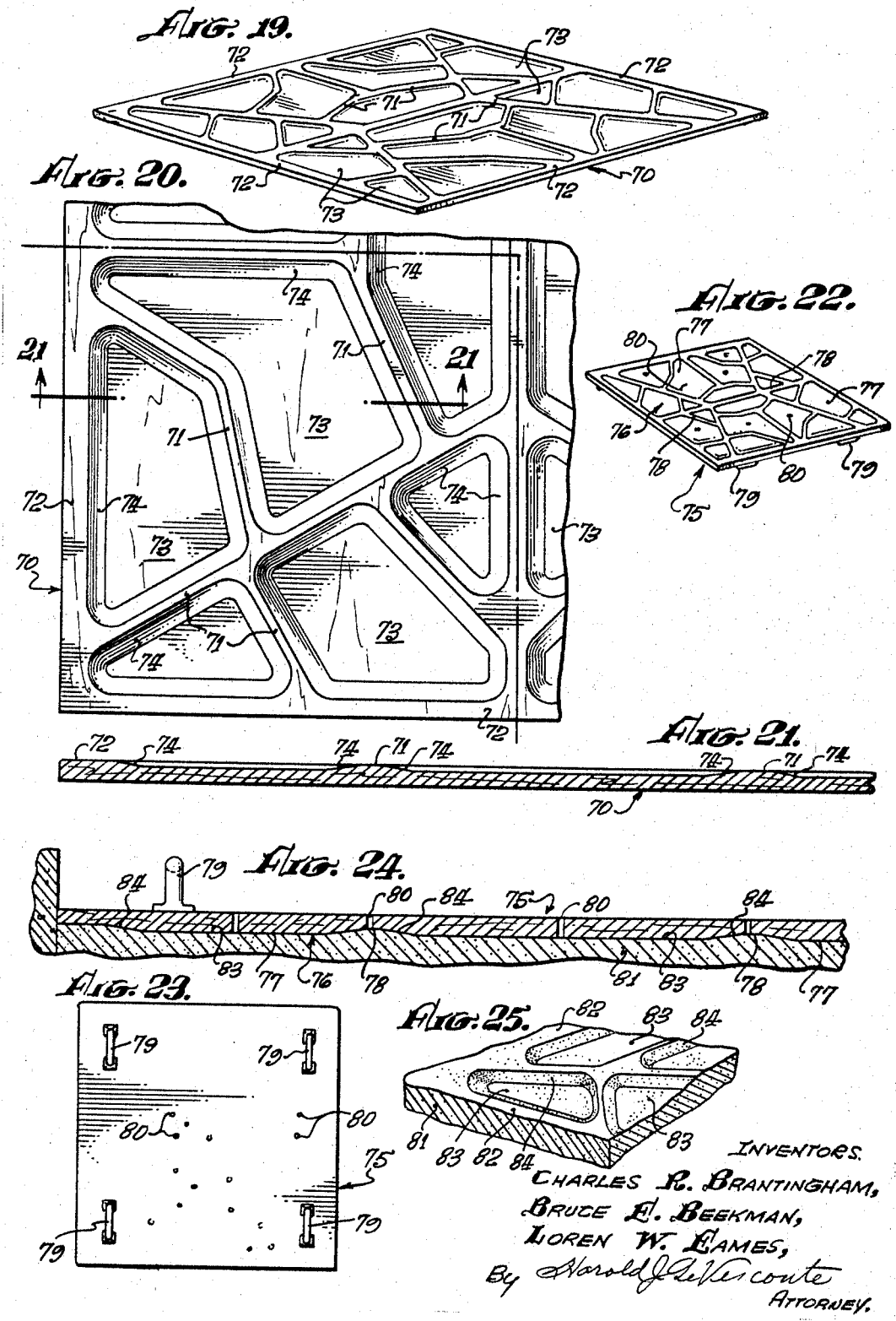

United States Patent Office 3,434,715  
Patented Mar. 25, 1969

3,434,715  
STRESS REDUCING FLOOR SURFACE  
Charles R. Brantingham, 110 Pine Ave. 90802, and Bruce E. Beekman, 154 Roycroft Ave. 90803, both of Long Beach, Calif., and Loren W. Eames, 4233 N. Peck Road, El Monte, Calif. 91732  
Filed Oct. 6, 1966, Ser. No. 584,871  
Int. Cl. A63g; A61h 7/00  
U.S. Cl. 272—57                                      10 Claims This invention relates to floor surfaces and more particularly to a form thereof affording greater comfort to persons whose occupation requires substantially constant standing at a given location as at a desk or counter or at the operating station of a machine, as well as persons whose activties keep them walking or standing on level, substantially unyielding floor surfaces.

Research has revealed that many forms of foot troubles are caused by the fact that the constant standing and/or walking on flat, unyielding surfaces results in the non-use of those leg muscles whose function is that of controlling compensatory action of the foot and ankle to variation in the plane or attitude of the surfaces encountered by the foot and that such troubles either disappear or are minimized when the person is caused to stand or walk upon a surface such that successive steps in walking or shifting of the feet while standing bring the foot into contact with different portions of the surface which cause the foot to assume a slightly different angular relation to the vertical as compared with the previous position occupied thereby.

This research has been conducted in part by the present applicants and such research is recorded, among other instances, in a paper entitled, "The Effect of Artificially Varied Surface on Ambulatory Rehabilitation with Preliminary EMG Evaluation of Certain Muscles Involved," presented at the annual meeting of the American Podiatry Association at Los Angeles, Calif. in August 1963, and printed in the Journal of the American Podiatry Association for October 1963. The paper defined the problem and the alleviating procedures therein described involved described exercises and the placing of certain pads between the foot of the subject and the shoe sole by way of proving the existence of the problem and more particularly defining the fact that many troubles arising in the forefoot derived directly from constant association with a flat, level unyielding floor surface.

Regarding the functional dimensions that the inventors have found through research and testing to be desirable for effective response, certain parameters have been determined as identifying the conditions and form of physical structure from which the optimum response has been observed.

The spacing of the areas which support portions of the foot at a higher elevation than other areas must be so placed that when the foot comes in contact with the floor surface embodying the invention, some portion of the sole must, by reason of its dimensions, rest upon one or more of such higher areas so that, regardless of the position of the foot, a non-planar surface is always encountered. The width dimensions of such higher areas, per se, must be of less than one-half the width dimension of the forefoot so that as the foot bears weight it must assume a position at a slight angle to the horizontal.

This non-planar surface must be so constructed as to cause the weight bearing foot to be slanted at an angle of approximately 3° to 5° from the horizontal. A greater angle than 5° has been found usually to result in a feeling of imbalance on the part of the user and an angle of less than 3° has been found to have less than the desired physiological effect.

The use of strips or ribbed areas of greater resilient density to accomplish the non-planar surface has been found to be superior to round, oval, square, triangular or other shapes for several reasons Most of the latter shapes tend to allow a degree of rocking around their edges or were also judged painful if of such size as to press against and thus force the weight to be borne by the primary arch of the foot. Since these discomforts may easily become safety hazards to any user and especially one with hypermobil ankles, the invention, assures a safe, stable weight bearing surface while imparting the desired physiological functions.

With the foregoing considerations in mind, it is the principal object of the present invention to provide a supporting surface on which a person may stand or walk and which is sufficiently uneven in its response to the imposed weight that each shift of position of either foot will cause the foot to assume a slightly different angular position with respect to the general flat plane of the floor surface and with resultant constant exercise of the muscles which determine the relation between the surface on which the person is standing and the vertical.

Another object of the invention is to provide a resilient floor covering means in which the aforesaid variations in resilient resistance to weight imposed thereon is achieved by a floor covering member having a surface comprising a plurality of closely spaced, vertically extending resilient protuberances arranged in a predetermined pattern of varying resilient response to weight imposed thereon by the feet of a person standing thereon.

Still another object of the invention is to provide a resilient floor covering means of the above character in which the varying resilient resistance to imposed weight is achieved by arranging the said resilient protuberances in a predetermined pattern of varying heights from the base from which they extend with consequent variation in the resilience thereof.

Still another object of the invention is to provide a resilient floor covering means in which the aforesaid variations in resilient resistance to imposed weight is achieved by varying the diameter of the resilient protuberances in a predetermined pattern with consequent variation in the resilient response thereof to weight imposed thereon by the feet of a person standing on said floor covering means.

Still another object of the invention is to provide a resilient floor covering means wherein the floor covering means constitutes a mat-like article which is compressibly resilient and which is of varying thickness in a predetermined pattern such that the resilient resistance thereof to the weight of a person standing thereon varies as the position of the feet changes.

A still further object of the invention is to provide a resilient cushion means for a floor covering means, which cushion means includes areas which vary in resilient resistance to weight imposed by a person standing thereon.

Still another object of the invention is to provide a floor covering capable of covering a wide surface and involving resilient protuberances formed integrally with a base and in which the protuberances are of varying resilience in a predetermined pattern arrangement and in which, further, the floor covering means is made up of a plurality of units of such size that they can be molded on existing press equipment and thereafter be united to form a floor covering of an area greater than could be accommodated in a molding press.

With the foregoing objects in view, together with such additional objects and advantages as may subsequently appear, the invention resides in the provision of a floor surface means having surface characteristics such that each shift of foot position of a person standing thereon will subject the foot to assume a slightly different angular position with respect to the vertical as disclosed, by way of example, of certain presently preferred modes of execution of the invention described in the following specification and illustrated in the accompanying drawings which form a part of said specification, and in which drawings:

FIGS. 1–8 relate to a first embodiment of the invention characterized by application of spaced cushion means to the underside of a resilient mat of uniform weight supporting thickness and in which:

FIG. 1 is a top plan view of a floor mat constituting a first embodiment of the invention, FIG. 2 is a bottom plan view of the mat shown in FIG. 1, FIG. 3 is an enlarged scale, fragmentary, sectional view taken on the line 3—3 of FIGS. 1 and 2, FIG. 4 is a fragmentary view of the portion of FIG. 3 indicated by the bracket associated with the numeral "4" in that figure and showing an alternative mode of construction, FIG. 5 is a sectional view like FIG. 3 but illustrating a second alternative form of the first embodiment as viewed, for example, in the plane of the line 5—5 on FIG. 6, FIG. 6 is a reduced scale, exploded view showing the mode of construction of the embodiment illustrated in FIG. 5, FIG. 7 is a fragmentary view similar to the left hand end of FIG. 5 but illustrating an alternative combination of mat and cushion means as viewed, for example, on the line 7—7 of FIG. 8, and FIG. 8 is an exploded view generally like FIG. 6 but employing the mat and cushion means illustrated in FIG. 7.

FIGS. 9–12 relate to a second embodiment of the invention characterized by variations in resiliency by variations in the form of weight supporting resilient protuberances on the floor covering means and in which:

FIG. 9 is a top plan view of a floor mat comprising a closely spaced series of cylindrical protuberances formed integrally with a base portion and in which the varying degrees of resilience are achieved by varying the lengths of the protuberances in a predetermined pattern, FIG. 10 is a fragmentary, enlarged scale transverse sectional view of a mat such as shown in FIG. 9 illustrating diagrammatically the varying lengths of the said protuberances for the desired variation in resilience over the mat area, the section being taken as on the line 10—10 of FIG. 9, FIG. 11 is a variation of the second embodiment of the invention in which the resilient cylindrical protuberances are applied to the under surface of the mat so that the mat presents a smooth surface for foot contact, and FIG. 12 illustrates still another modification of the second embodiment of the invention in which the variation and resilient resistance to the weight of a person is achieved by forming the protuberances of uniform height but of varying diameters.

FIGS. 13 through 18 contemplate the embodiment of the invention in mats of such size as to cover an entire floor area and in this group of figures:

FIG. 13 is a fragmentary perspective view of a floor covering means comprising an upper floor covering component of uniform thickness and flexibility underlain by a cushion means also of uniform thickness but of varying resilient resistance to foot pressure in a predetermined pattern, FIG. 14 is an enlarged scale fragmentary sectional view of the floor covering construction shown in FIG. 13, FIG. 15 is a reduced scale, fragmentary top plan view showing in exploded form a mode of construction of a floor covering embodying the present invention made up of a plurality of molded mats united by integrally formed overlapping flanges on said mats and on an associated border means, FIG. 16 is a fragmentary top plan view of a united mat formed of the component parts shown in FIG. 15, FIG. 17 is a fragmentary, enlarged scale view of a floor mat such as shown in FIGS. 15 and 16, as taken, for example, in the plane of the line 17—17 of FIG. 16 and employing mats having protuberances of varying height as shown in FIG. 10 and having extruded, border forming elements, and FIG. 18 is a view generally similar to FIG. 17 but employing a molded border element and employing molded protuberances of varying diameters as disclosed in FIG. 12 to produce the desired variation in resilient response.

FIGS. 19–25 relate to that phase of the invention which comprises the provision of a floor surface having the non-planar characteristics achieved by the covering means of the previously illustrated and described embodiments realized by the incorporation thereof into the floor surface itself and in this series of figures:

FIG. 19 shows in perspective a panel having an upper surface embodying the principles of the invention, FIG. 20 is an enlarged scale, top plan view of a portion of the panel shown in FIG. 19, FIG. 21 is a further enlarged, fragmentary section taken as on the line 21—21 of FIG. 20, FIG. 22 is a perspective view of the bottom surface of a panel employed to produce a floor surface of the same characteristic as shown in FIGS. 19 and 20 in a moldable material, FIG. 23 is a top plan view of the molding panel shown in FIG. 22, FIG. 24 is a greatly enlarged fragmentary section of a molding panel such as shown in FIG. 22 as applied to a plastic floor surface forming material, and FIG. 25 is a fragmentary perspective view, greatly enlarged, showing a floor surface such as would be produced using a molding panel such as shown in FIGS. 22 and 23.

Before going into a detailed description of the various embodiments of the invention disclosed in the drawings, it will be borne in mind that the term "floor surface" is to be regarded as the surface contacted by the foot or feet of a person standing thereon and any and all associated elements which impart the irregular surface effect sought to be obtained for the purposes of the invention. Also, the term "mat" as used in the specification will be understood to include all sizes and configurations whether merely loosely laid on a supporting, non-resilient floor surface or to be adhered or otherwise secured on the supporting surface.

Referring to the drawings, and considering the first embodiment shown in FIGS. 1–8, and more particularly the form thereof shown in FIGS. 1–4, the fundamental component is a flexible rubber mat 20 having a resilient surface formed of closely spaced, resilient, cylindrical, protuberances 21 formed integrally with the base portion 22, the mat area being preferably surrounded by a border rim portion 23. The protuberances 21 are of uniform size and length and of such resilient characteristics as to yield somewhat by bending when subjected to the weight of a foot of a person thereon.

Referring next particularly to FIGS. 2 and 3, the under surface of the mat is provided with a plurality of strips 24 of soft rubber of irregular shape fixed thereto in random spaced relation by any appropriate means such as by adhesive or vulcanization. Preferably the edges of the strips are disposed at different angles to each other and generally diagonally with respect to the edge surfaces of the mat and producing a contour to the upper surface of the mat which is substantially corresponding to the contour of the bottom surface of the mat as affected by the added strips. FIG. 3 illustrates the contour of the upper surface of the mat thus produced.

While in the foregoing specification the material has been designated as "rubber" of various characters, it will be understood that that term is intended to include, as well, any equivalent elastomeric material having the necessary characteristics. To this end, certain of the cross sectional views are crosshatched to indicate a plastic material.

Assuming that the illustrated mat is disposed at a work station, e.g., that of a bank teller, it will be evident that as the occupant of that station changes foot positions, each such change will subject the foot to some slight angular departure from the horizontal and reflexively cause the various muscles which control such foot position to variably extend and contract to maintain the vertical attitude of the leg for it is the automatic, balanced, myotonic effort of these muscles which has been found to eliminate, or at least minimize, the deleterious effects of constant standing on flat, unyielding surfaces.

Referring next to FIG. 4, if desired, the equivalent configuration of the strips 24 may be molded onto the bottom surface of the mat as shown at 25. This possesses the advantage of economy of manufacture at the expense of the advantage of the mats shown in FIGS. 1 and 3 in which a quantity of flat mats may be supplied with the strips 24 thereof differently arranged to suit particular requirements of possible different usages. The arrangement of strips for different work stations according to the manner in which the occupant stands or moves may be improved by different particular arrangements.

FIGS. 5 and 6 show another modification of the first embodiment of the invention in which a mat of the general type shown in FIGS. 1 and 2 is mounted on and adhered to a pad 26 of soft rubber which is perforated to provide a pattern of ribs 27 and an integral border 28. Some manufacturing economy derives from the fact that the mat and the pad are more readily assembled. While as indicated in FIG. 5, the pad may be adhered to the mat by suitable adhesive 26′, in some cases the mere frictional engagement between the mat and pad may suffice. The result of use is the same as in the first described embodiment of the invention.

FIGS. 7 and 8 show a variation of the modification shown in FIGS. 5 and 6 in that the mat 20′ is formed of soft rubber-like material of uniform thickness and this pad supported by a sheet rubber molding 29 having integral ribs 30 corresponding to the rib 27 shown in FIG. 6 and formed integrally therewith and with an integrally formed border 31 corresponding to the border portion 28 shown in FIG. 6, the mat being adhered to the upper surfaces of the rib and border as in the previously described embodiment of the invention.

The second embodiment of the invention is illustrated in FIGS. 9–12 and proposes to provide the variably yielding floor effect by variation in the resistance to load of cylindrical protuberances such as shown in FIGS. 1–4.

In the examples shown in FIGS. 9 and 10, the rubber mat 32 illustrated comprises an integrally molded base 33 and border 34, the upper side of the base being provided with integrally molded upwardly extending cylindrical protuberances of varying lengths and including full length protuberances 35 and shorter protuberances of three-quarter length, half length and one-quarter length of the protuberances 35 designated, respectively, by the numerals, 36, 37 and 38.

Assuming, for the sake of example, that the areas of greatest resistance be comparable in size and location to those represented by the strips 24 shown in FIG. 2 as indicated in dotted lines in FIG. 9, FIGS. 9 and 10 contemplate the arrangement of the protuberances with the protuberances 35 covering the rest of the area of the mat with the exception that selected numbers of the three-quarter length areas of different resilient resistance to foot imposed loads through variation of integrally formed resilient protuberances. This mode involves the provision of protuberances of uniform length rising or depending from a base surface. In this mode of that embodiment, the variation of resilience is achieved by variation in the diameter of those protuberances whereby those of lesser diameter, of course, present less resistance to imposed weight. Specifically, the resilient rubber mat 46 here shown, like all of the preceding mats, includes a base 47 having a border portion 48 and resilient protuberances of uniform length but of different diameters formed integrally with and rising from the upper surface of the base; said protuberances including large, intermediate and small diameter protuberances designated, respectively, by the numbers 49, 50 and 51. These protuberances are arranged in such a pattern, e.g., those shown in FIGS. 6 or 9, as may be desired. These protuberances, by reason of different diameters, possess different resistance to foot weight imposed thereon with consequent change in foot angle. From the fact that this last modification of the second embodiment of the invention involves protuberances of three different resiliencies, and the further fact that the first described form thereof shows four different resiliencies, it will be appreciated that any number of different amounts of resilience may be employed. Also, in view of the disclosure in FIG. 11, it will be understood that the invention contemplates the fact that the protuberances shown in FIG. 12 might, if desired, be employed in the inverted form as shown in FIG. 11.

FIGS. 13 and 14 relate to an embodiment of the invention which comprises a resilient cushion means 52 of uniform thickness but of varying resilient reaction to foot imposed loads thereon. In this embodiment, the cushion means 52 comprises a base portion 53 formed of a less resilient rubber material and including a surrounding narrow border 54 and a network of rib members 55 extending in some predetermined regular or irregular pattern, the spaces 56 defined by the border and ribs being filled with a softer rubber and hence yielding more readily to foot pressure whereby different foot positions on a mat or rug R overlying the cushion of this embodiment will produce the desirable myotonic effort of the leg muscles. This form of the invention has the advantage that it is capable of manufacture in large sizes by rolling or calendering processes as distinguished from those forms embodying vertically disposed resilient protuberances which require the use of a press and hence, as individual units, are limited in the maximum area that can be provided by the platen means of such a press.

For those instances in which it may be desired to cover a larger area than the area of a mat which can be formed on a press, a mode of making such large floor covering from a plurality of identical units is illustrated in FIGS. 15–18. In this embodiment, the rectangular mat sections 57 have an upper face 58 covered with cylindrical protuberances of any of the forms heretofore described, i.e., identical in diameter but varying in length or identical in length but of varied diameter. The illustrated embodiment includes a mat which is provided with a lower face portion 59 which is of the same rectangular area as the upper face but which is diagonally offset therefrom with the resultant formation of a pair of downwardly facing flange sections 60, 60 extending along two adjacent sides and forming one of the corners of the mat unit and two adjacent upwardly facing flange portions 61, 61 extending along the other two adjacent sides and forming the diagonally opposite corner of the mat unit, the adjacent ends of the upwardly and downwardly facing flange portions forming the other two corners of the unit. Preferably, these flange portions are of half the thickness of the base portion of the mat unit.

By means of these flange portions, a plurality of such mat units of identical rectangular dimensions may be fitted together with the complementary flanges interengaging as shown in FIGS. 17 and 18 to form the area to be covered by the mat thus created. If desired, the resulting mat can be finished off by border portions including border members 62 having upwardly facing flanges which are complementary to the downwardly facing flange units arranged along the side of the mat and to which they may be adhered by any desired means. The other two sides of the resulting mat may be finished by border elements 64 having the under side thereof cut away as at 65 to form a downwardly facing surface which is complementary to the upwardly facing flanges 61 of the mat units along the other two sides of the built-up mat. FIG. 18 shows a border section having an upper surface comprising upwardly projecting cylindrical protuberances arranged in gradually decreasing length toward the outer edge of the border as indicated at 62' and 64'. Such border pieces cannot be formed in long lengths by an extrusion process as can the border 62 and 64 but must be molded in the same manner as the mat unit 58.

While in the foregoing drawings and specification, certain presently preferred embodiments of the invention have been disclosed, the invention is not to be deemed to be limited to the precise details of construction thus disclosed by way of example, and it will be understood that the invention includes all such modifications and changes of the disclosed embodiments as shall come within the purview of the appended claims.

We claim:

1. A resilient floor including a surface component of elastomeric material capable of inducing substantially continuous balanced myotonic effort in the leg muscles of a person whose work requires standing for prolonged periods of time at a work station or the like; said component being characterized by having a series of areas of lesser resilient resistance to the weight of a foot of a person imposed thereon separated by elongated areas of greater resilient resistance to such weight, the width of said areas of lesser resilient response being not greater than half the width of the forefoot portion of a person standing thereon and the difference in resiliency between said areas of lesser and greater resilient resistance being such that when subjected to the weight of a person standing thereon and engaging portions of one each of both of said areas, the resulting angularity of the foot will not exceed about 5° from the horizontal.

2. A floor as claimed in claim 1 in which said surface component comprises a body of uniform thickness and resiliency with a series of rib members on the under surface thereof combining with the body of said component to form said areas of greater resilient resistance to foot imposed loads thereon.

3. A floor as claimed in claim 1 in which said surface component comprises a base portion on which said areas of different resiliency are formed by a plurality of protuberances extending in closely spaced parallel relation from said base portion of said component and in which said protuberances are of different lengths with the shorter ones thereof arranged to form said areas of lesser resilient response to foot imposed loads.

4. A floor as claimed in claim 1 in which said surface component comprises a base portion and in which said areas of different resilient resistance are formed by a plurality of protuberances projecting in closely spaced parallel relation from said base portion; said protuberances being of substantially uniform length but of different diameters with protuberances of greater diameter being arranged to form said areas of greater resilient resistance to foot imposed loads.

5. A floor as claimed in claim 1 in which said areas of said surface component of greater resilient resistance are formed of elastomeric material of greater density and surround portions of elastomeric material of lesser density constituting said areas of lesser resilience to foot imposed loads.

6. A floor as claimed in claim 2 in which said body of said surface component comprises a base portion having a plurality of closely spaced proturberances projecting from one face thereof.

7. A floor means as claimed in claim 3 in which said surface component is formed of a plurality of rectangular sections bordered on two adjacent sides by upwardly facing flanges and on the other two sides by downwardly facing flanges complementary to the upwardly facing flanges on others of said sections and said sections being united by securing said flanges in overlapping relation and in which said component further includes border sections having downwardly facing flange portions and upwardly facing flange portions complementary to the exposed flanges of the united plurality of rectangular sections.

8. A floor as claimed in claim 4 in which said surface component is formed of a plurality of rectangular sections bordered on two adjacent sides by upwardly facing flanges and on the other two sides by downwardly facing flanges complementary to the upwardly facing flanges on others of said sections and said sections being united by securing said flanges in overlapping relation and in which said component further includes border sections having downwardly facing flange portions and upwardly facing flange portions complementary to the exposed flanges of the united plurality of rectangular sections.

9. A floor as claimed in claim 7 in which said surface component further includes a first pair of border elements having downwardly facing flanges complementary to and secured to the sides of said component having upwardly facing flanges and a second pair of border elements having upwardly facing flanges complementary to and secured to the downwardly facing flanges of said component.

10. A floor as claimed in claim 8 in which said surface component further includes a first pair of border elements having downwardly facing flanges complementary to and secured to the sides of said component having upwardly facing flanges and a second pair of border elements having upwardly facing flanges complementary to and secured to the downwardly facing flanges of said component.

References Cited

UNITED STATES PATENTS

| | | | |
|---|---|---|---|
| 863,054 | 8/1907 | Dickerson | 272—56.5 |
| 2,465,725 | 3/1949 | Herzmark | 272—57 |
| 2,476,921 | 7/1949 | Shock | 272—57 |
| 2,680,698 | 6/1954 | Schnee | 272—57 |
| 2,820,454 | 1/1958 | Wright | 272—57 |
| 2,868,191 | 1/1959 | Juhasz | 128—25 |
| 2,924,455 | 2/1960 | Brunel | 272—56.5 |
| 3,100,483 | 8/1963 | Altmeyer | 128—25 |
| 3,350,092 | 10/1967 | Moki | 272—56.5 |

FOREIGN PATENTS

| | | |
|---|---|---|
| 1,128,081 | 4/1962 | Germany. |

RICHARD C. PINKHAM, *Primary Examiner.*

R. W. DIAZ, Jr., *Assistant Examiner.*

U.S. Cl. X.R.

128—62

UNITED STATES PATENT OFFICE
CERTIFICATE OF CORRECTION

Patent No. 3,434,715                      March 25, 1969

Charles R. Brantingham et al.

It is certified that error appears in the above identified patent and that said Letters Patent are hereby corrected as shown below:

In the drawings, cancel Sheet 5 comprising FIGURES 19 through 25. Column 4, line 16, beginning with "FIGS. 19-25" cancel all to and including "22 and 23." in line 40, same column 4.

Signed and sealed this 14th day of April 1970.

(SEAL)
Attest:

Edward M. Fletcher, Jr.                        WILLIAM E. SCHUYLER, JR
Attesting Officer                               Commissioner of Patents